Jan. 1, 1952     T. W. THORNTON     2,580,485
TORPEDO MOTION RECORDER.

Filed April 12, 1946     10 Sheets-Sheet 1

T. W. Thornton

Jan. 1, 1952     T. W. THORNTON     2,580,485
TORPEDO MOTION RECORDER
Filed April 12, 1946     10 Sheets-Sheet 3

Inventor
*T. W. Thornton*

By M. O. Hayes
Attorney

Jan. 1, 1952 T. W. THORNTON 2,580,485
TORPEDO MOTION RECORDER
Filed April 12, 1946 10 Sheets-Sheet 4

Inventor
T. W. Thornton
By
M. O. Hayes
Attorney

Jan. 1, 1952 — T. W. THORNTON — 2,580,485
TORPEDO MOTION RECORDER
Filed April 12, 1946 — 10 Sheets-Sheet 5

Inventor
T. W. Thornton
By M. O. Hayes
Attorney

Inventor
T. W. Thornton

Jan. 1, 1952 T. W. THORNTON 2,580,485
TORPEDO MOTION RECORDER
Filed April 12, 1946 10 Sheets-Sheet 7

Inventor
T. W. Thornton
By M. Hayes
Attorney

Jan. 1, 1952 T. W. THORNTON 2,580,485
TORPEDO MOTION RECORDER
Filed April 12, 1946 10 Sheets-Sheet 8

Inventor
T. W. Thornton

By M. O. Hayes
Attorney

Jan. 1, 1952     T. W. THORNTON     2,580,485
TORPEDO MOTION RECORDER

Filed April 12, 1946     10 Sheets-Sheet 9

Inventor
*T. W. Thornton*

By
*M. O. Hayes*
Attorney

Patented Jan. 1, 1952

2,580,485

UNITED STATES PATENT OFFICE 2,580,485

TORPEDO MOTION RECORDER

Theodore W. Thornton, Salt Lake City, Utah

Application April 12, 1946, Serial No. 661,634

20 Claims. (Cl. 346—107)

(Granted under the act of March 3, 1883, as amended April 30, 1928; 370 O. G. 757)

This invention relates generally to measuring and recording devices and more particularly to a device adapted to measure and record the angular motion with respect to three mutually perpendicular axes of a moving body projected along a path of travel.

The device of the present invention is specially adapted for use in the measurement and recording of the magnitude of pitch, roll and yaw of a torpedo during a test run thereof and, in its broader aspects, comprises a pair of electrically driven gyroscopes which establish a reference system from which measurements are taken. A plurality of additional reference points are provided within the torpedo and are adapted angularly to move therewith such that the relative motion between the gyros and the reference points provides a measure of the angular motion of the torpedo. A conventional movie camera is employed to record the motion of the reference points with respect to the gyros, the camera, in turn, being controlled by a relaxation oscillator whereby photographs are taken at fixed intervals and a time reference axis is provided for use in transcribing the data on the film into graphic form.

The gyros and camera are set in operation by a hydro-inertia switch during the launching of the torpedo with additional means being provided for opening all the electrical circuits in the recorder when a predetermined interval has elapsed after the recorder is set in operation.

It will be understood that the aforedescribed arrangement is adapted to measure and record long period deviations of the torpedo from a straight line. If it is desired to measure and record short period deviations from a reference system, each one of the gyros is mounted pendulously with additional weights secured thereto and is supported in gimbal rings, one of the gyros further being provided with a restoring spring.

It is an object of the present invention to provide a new and improved device for measuring the angular motion of a moving body projected on a path of travel.

Another object is the provision of a torpedo motion recorder adapted to measure and record short period deviations of the torpedo from a reference system.

Another object is to provide a device for recording the angular deviations of a moving body from a reference system and which is adapted to be set in operation automatically upon the projection of the body carrying the device.

Another object is the provision of a torpedo motion recorder in which the position of a plurality of reference points within the torpedo with respect to a reference system provided by a pair of gyros is photographed and in which the photographs are taken at predetermined intervals to provide a time reference axis.

Another object is the provision of a torpedo motion recorder of the above character in which the gyros are locked in an initial position until the torpedo is launched to establish an accurate zero reference point.

A further object is to provide a recorder of the aforedescribed character in which the photographs taken by the camera are numbered consecutively.

A still further object is the provision of a recorder of the aforedescribed character which is adapted to be set in operation automatically as the body associated therewith is projected on a path of travel and which is adapted to be cut off automatically when a predetermined interval has elapsed after the body has been projected.

Still another object is to provide a motion recorder which is self contained and requires no external connections or controls, and which is efficient in service and reliable in operation.

Still other objects and advantages will be apparent from the following description taken in connection with the accompanying drawings of which.

Figure 1:
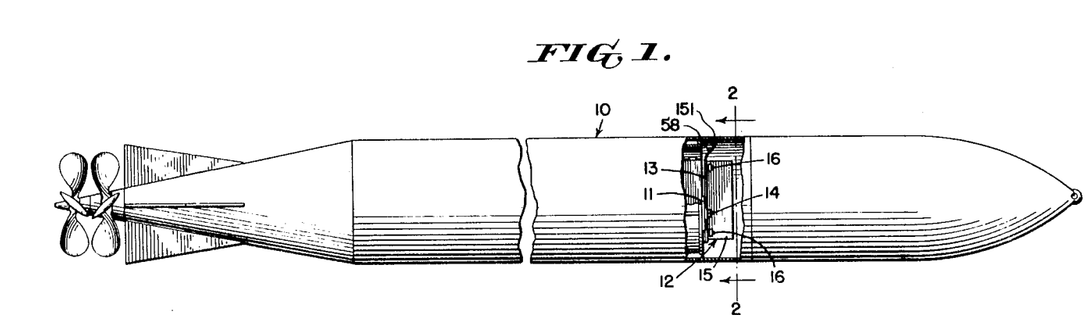
Fig. 1 is a side elevation of a torpedo with a portion thereof broken away to show the orientation of the device of the present invention with the torpedo.
Figure 2:
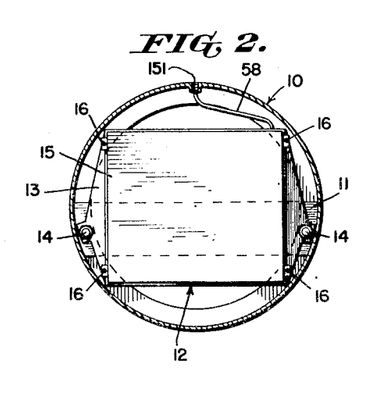
Fig. 2 is a sectional view taken substantially along line 2—2 of Fig. 1.

Referring now to the drawings, wherein like characters of reference refer to like parts throughout the several views and more particularly to Figs. 1 and 2 thereof, the numeral 10 generally designates a conventional torpedo having an athwartship partition or bulkhead 11 in the forward portion thereof. The device of the present invention, indicated generally by the numeral 12, is supported on a mounting plate 13 which is secured to the bulkhead by screws 14, a suitable cover 15 being provided for the device and screwed to the mounting plate by screws 16.

The recorder of the present invention comprises two similar electric gyroscopes 17 and 18 which provide a reference system. Gyroscope 17 is mounted pendulously with the axis thereof in a vertical plane whereby the gyroscope is rendered responsive to pitch and roll of the torpedo during its movement. Gyroscope 18 is arranged pendulously with the axis thereof in a horizontal plane whereby it is rendered responsive to yaw and roll of the torpedo during its movement. Each one of the gyros 17 and 18 comprises an outer gimbal 19 and an inner gimbal 21 pivotally secured within a slotted portion 22 of the outer gimbal by screws 23. The outer gimbal 19 is rigidly secured to an angle shaped member 24 by means of a U-shaped block 25 and screws 26, member 24 being rigidly secured to the mounting plate 13 by bolts 27 such that the outer gimbal is caused exactly to follow the angular motion of the torpedo. Each of the driving motors for the inertia elements 28 is encased in a suitable housing 29 to which is secured by screws 31 a C-shaped indicating member 32, the purpose of which will hereinafter be disclosed.

Figure 9:
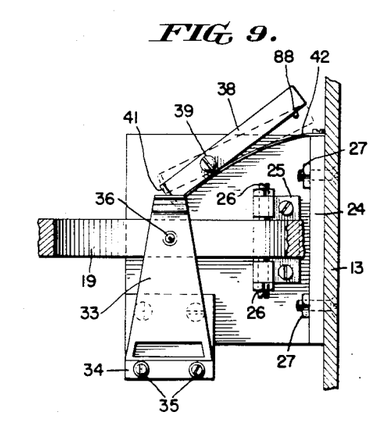
Fig. 9 is a detail view of the locking mechanism associated with the gyro shown in Fig. 8.

A cantilever type spring 33 is secured to the angle shaped member 24 by means of a block assembly 34 and screws 35. Spring 33 carries a pin 36, Figs. 9 and 11, thereon which is adapted to engage a small hole 37 in the motor housing 29, thereby to lock the housing in an initial position. Pin 36 is initially maintained in engagement with hole 37 by a lever 38 which is pivotally mounted about screw 39. The lever 38 is provided with an ear-like portion 41 which is adapted to engage spring 33 in such a manner as to maintain the pin 36 initially in engagement with hole 37. Secured to the member 24 is a leaf spring 42 adapted to engage the under side of lever 38 and cause the lever to move about its pivot point, thereby to release spring 33 and disengage pin 36 from hole 37 to release the motor housing for angular motion.

Figure 15:
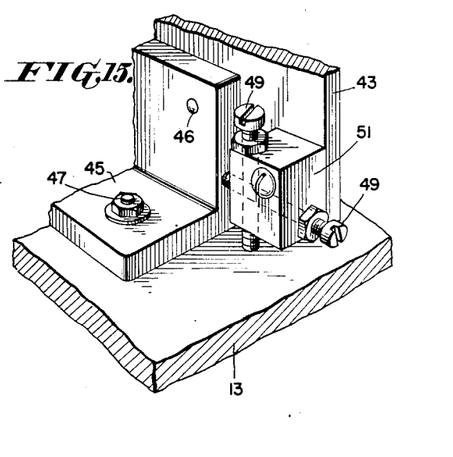
Fig. 15 is detail perpective view of the adjustable grid plate mounting means.
Figure 16:
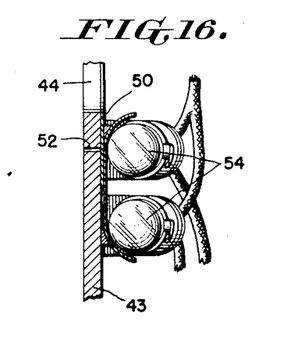
Fig. 16 is a sectional view with certain parts in elevation taken substantially along the line 16—16 of Fig. 13.
Figures 23, 24:
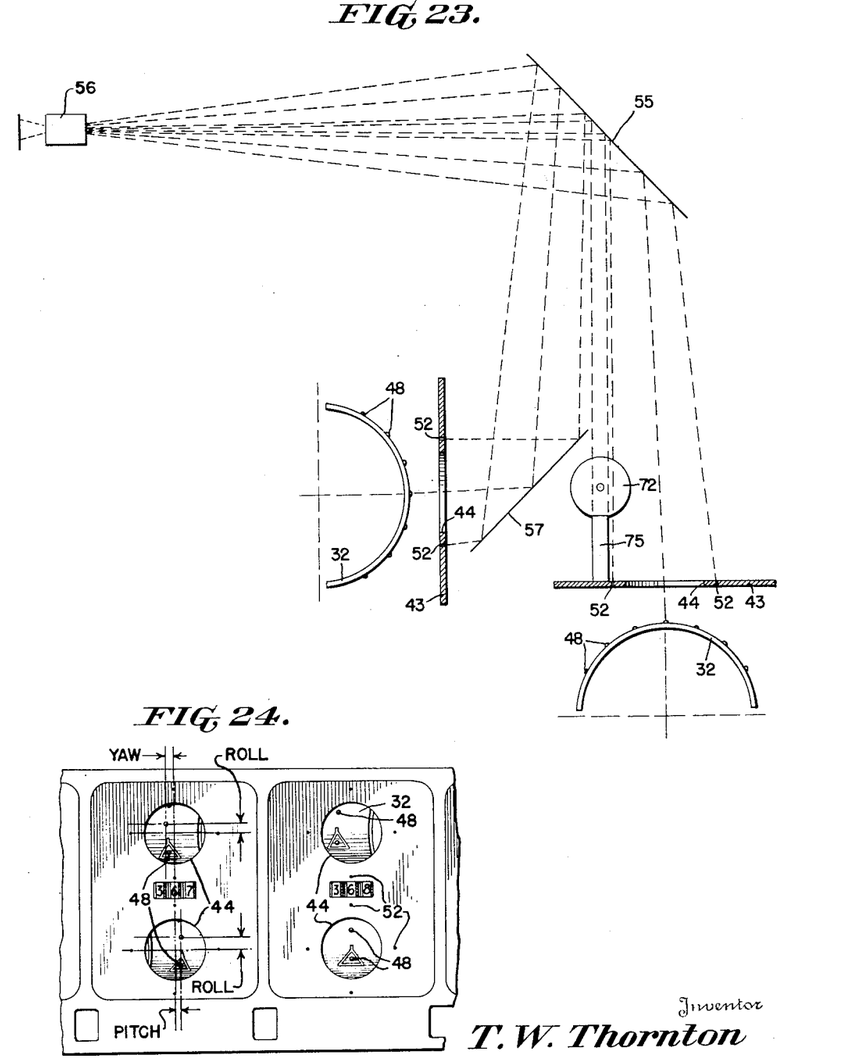
Fig. 23 illustrates in diagrammatic form the arrangement of the mirrors employed to reflect the required data on the film.
Fig. 24 is a fragmentary view showing a portion of the exposed film.

Arranged in front of each one of the indicating members 32 is a grid plate 43, Figs. 12 to 16, having an opening 44 therein through which the indicating member 32 associated therewith may be viewed, Fig. 23, the grid plates being secured to the mounting plate 13, Fig. 15, through an angle block 45 by means of screws 46 and bolts 47. Alined on the members 32 in predetermined spaced relation are an odd number of metallic reflecting balls 48, the spacing therebetween corresponding to a predetermined number of degrees. The center ball is alined with the center of the opening 44, when the motor housing 29 is in the locked position, by adjusting the grid plate by means of the adjusting screws 49 provided in a block 51 formed integrally with the grid plate, Fig. 15. Four reference holes 52, Figs. 12, 14, 16 and 23, are cut in the grid plate and are positioned at ninety degree intervals with respect to the center of the dial opening 44 such that the position of the balls with respect to the reference holes represents a measure of the angular motion of the torpedo with respect to the reference system. It will be noted that each ball 48 is surrounded by a distinctive geometric symbol, Figs. 11 and 24, in order that positive identification of the position of the indicating member with respect to the grid plate may be facilitated.

Three of the reference holes 52 are provided each with a light bulb 63 mounted on the gyro side of the grid plate adapted to direct a beam of light through a translucent screen 50 and the holes, the surface of the bulbs being painted black except for a small portion thereof nearest the gyro side of the grid plate a pair of light bulbs 54 are respectively adapted to direct a beam of light through the fourth reference hole and to supply light to the indicating member 32 for reflection therefrom by the balls 48 and geometric figures through the dial opening in the grid plate, it being understood that the surface of the indicating member is painted black and the geometric figures are painted white. A pair of light bulbs 70 are adapted to direct a beam of light to the numerals of the counter mechanism 73, Figs. 20 to 22.

Figure 3:
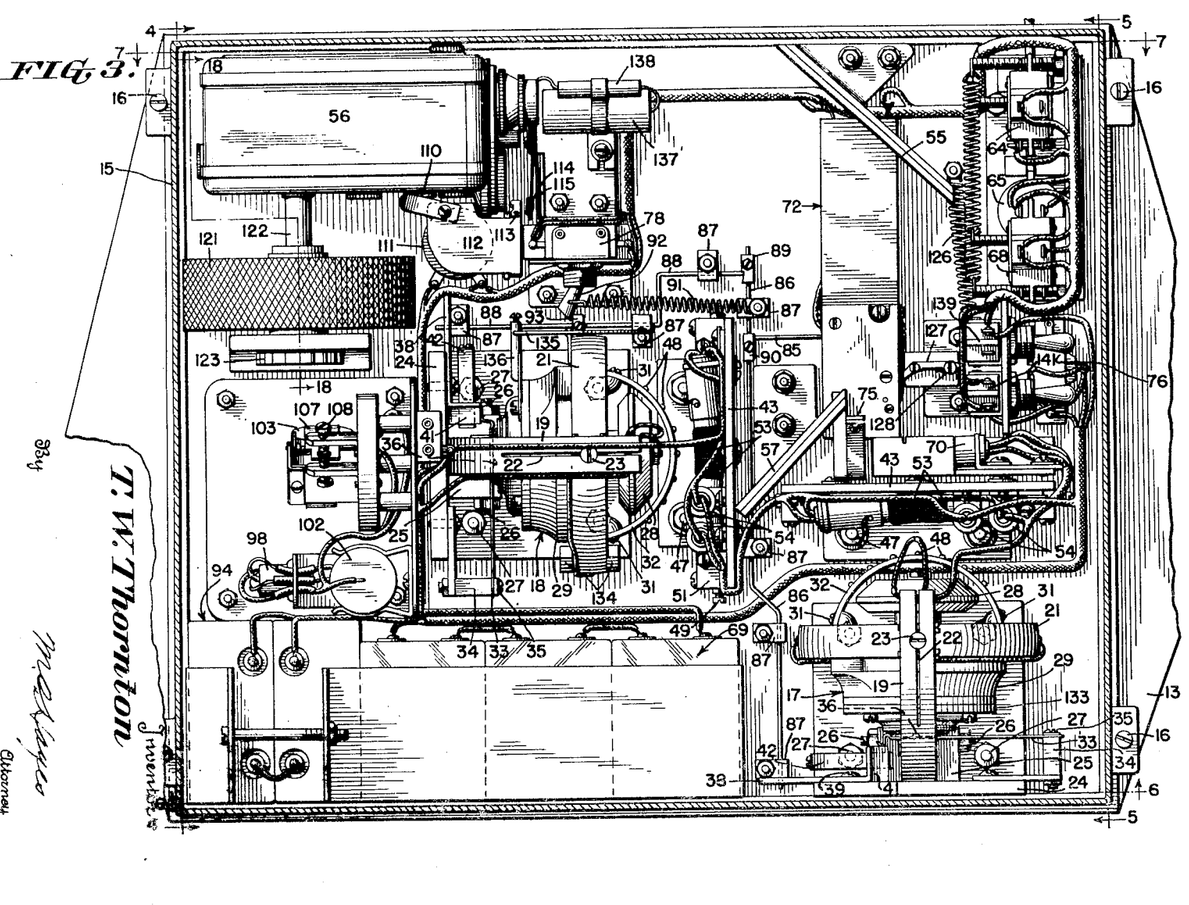
Fig. 3 is a vertical sectional view through casing of the recorder and showing the elements thereof in elevation.
Figure 4:
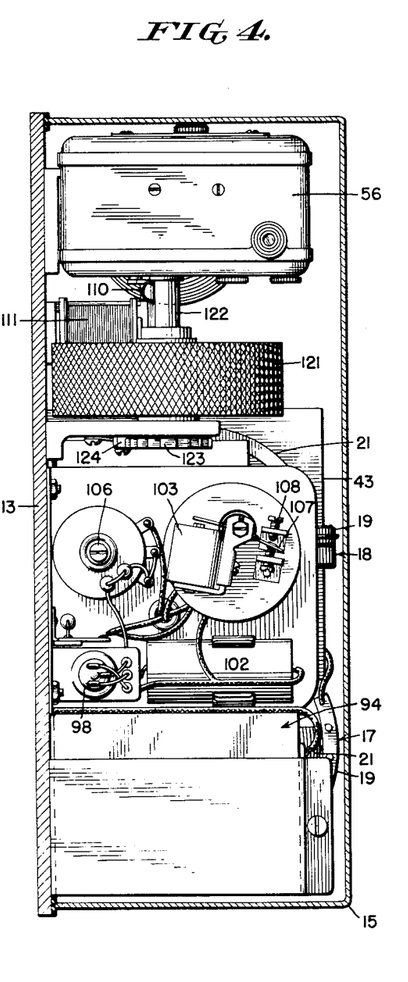
Fig. 4 is a view in section taken substantially along the line 4—4 of Fig. 3.
Figure 6:
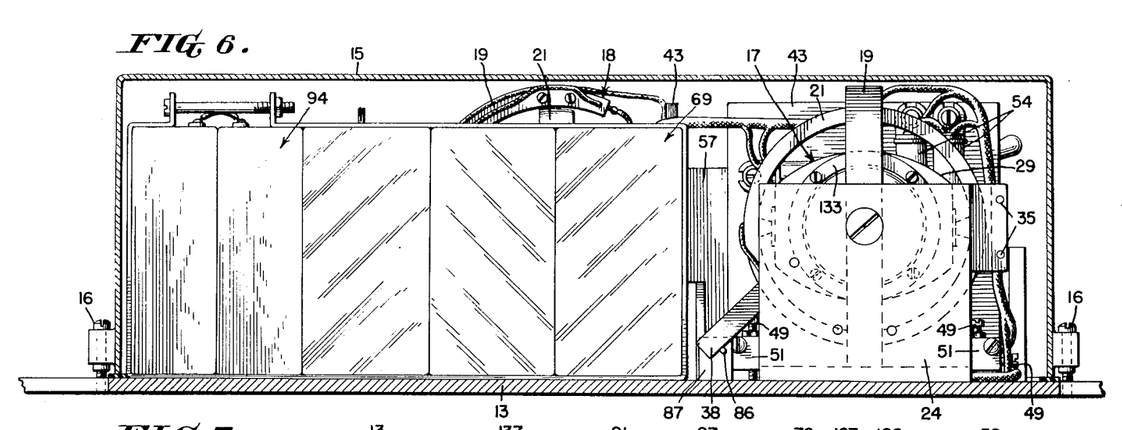
Fig. 6 is a view in section taken substantially along the line 6—6 of Fig. 3.
Figure 7:
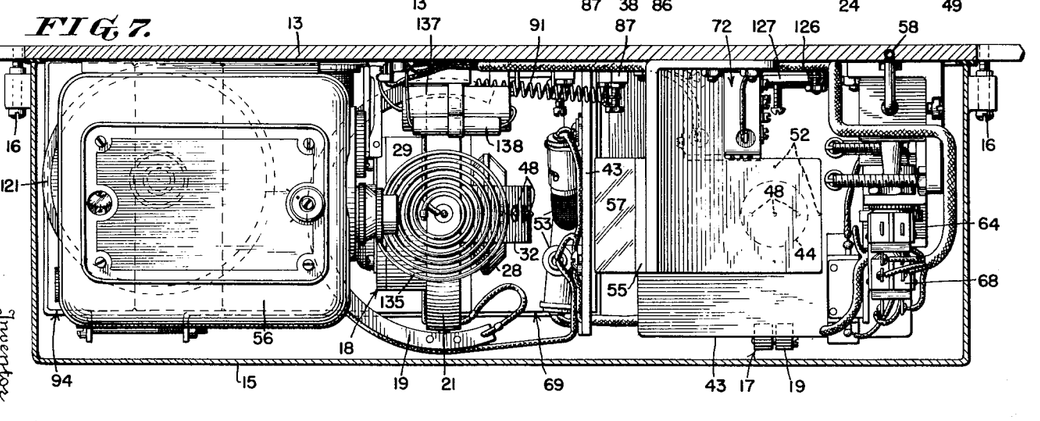
Fig. 7 is a view in section taken substantially along the line 7—7 of Fig. 3.

The beams of light passing through the grid plate associated with gyro 17 are reflected by a mirror 55, Figs. 3, 7 and 23, secured to the mounting plate 13 in any suitable manner, to the lens of a suitable moving picture camera 56. The light beams passing through the grid plate associated with gyro 18 are reflected sequentially by a mirror 57, Figs. 3, 6 and 23, arranged angularly with respect to the grid plate 43 and thence by mirror 55 to the camera 56. The camera 56 is adapted to record on film the position of the indicating members 32 with respect to their individual grid plates.

Figure 5:
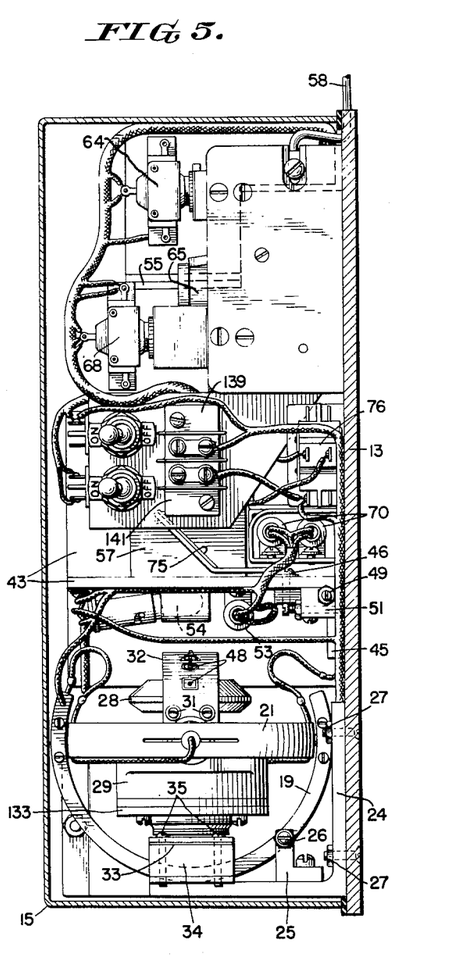
Fig. 5 is a view in section taken substantially along the line 5—5 of Fig. 3.
Figure 5A:
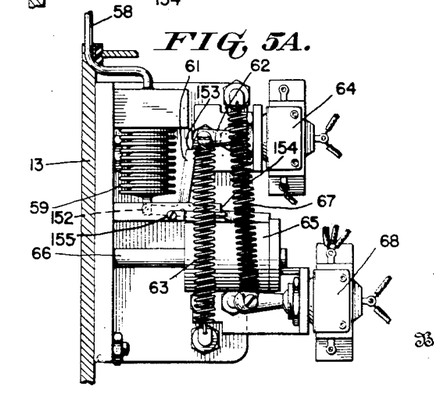
Fig. 5A a view in elevation showing the hydro-inertia switch employed in the present invention.

Referring now to Fig. 5A, there is shown thereon a hydro-inertia switch adapted to initiate the operation of the recorder as the torpedo is fired, the switch being of the type described and claimed in a copending application of T. W. Thorton for Hyro Inertia Switch, Serial No. 661,633, filed April 12, 1946 now Patent No. 2,549,863, April 24, 1951. The switch comprises a tube 58, one end of which connects to the interior of a bellows 59. The other end of the tube passes through an opening 151, Figs. 1 and 2, in the torpedo casing. Bellows 59 is pivotally secured at 152 to a T-shaped lever 61 which is rotatably mounted on pivot pin 155. One arm of lever 61 initially engages release lever 62 at 153 and the other arm of the lever 61 engages a shoulder at 154 formed on inertia member 65. Inertia member 65 is slideably mounted on shaft 66. As the water pressure in the submarine torpedo tube is increased as the torpedo is launched, this increase in water pressure is transferred to the interior of the bellows by the tube 58 thus expanding the bellows. When this occurs, a T-shaped lever 61 is caused to rotate about pin 155 in a counterclockwise direction as viewed in Fig. 5A to release lever 62 whereupon the lever 62 is moved under power of a spring 63 to close a switch 64. Movement of lever 61 also releases the inertia element 65 such that acceleration of the torpedo within the torpedo tube causes the element to move toward the left as viewed in Fig. 5A along shaft 66 thereby rendering spring 67 effective to close switch 68.

Figure 26:
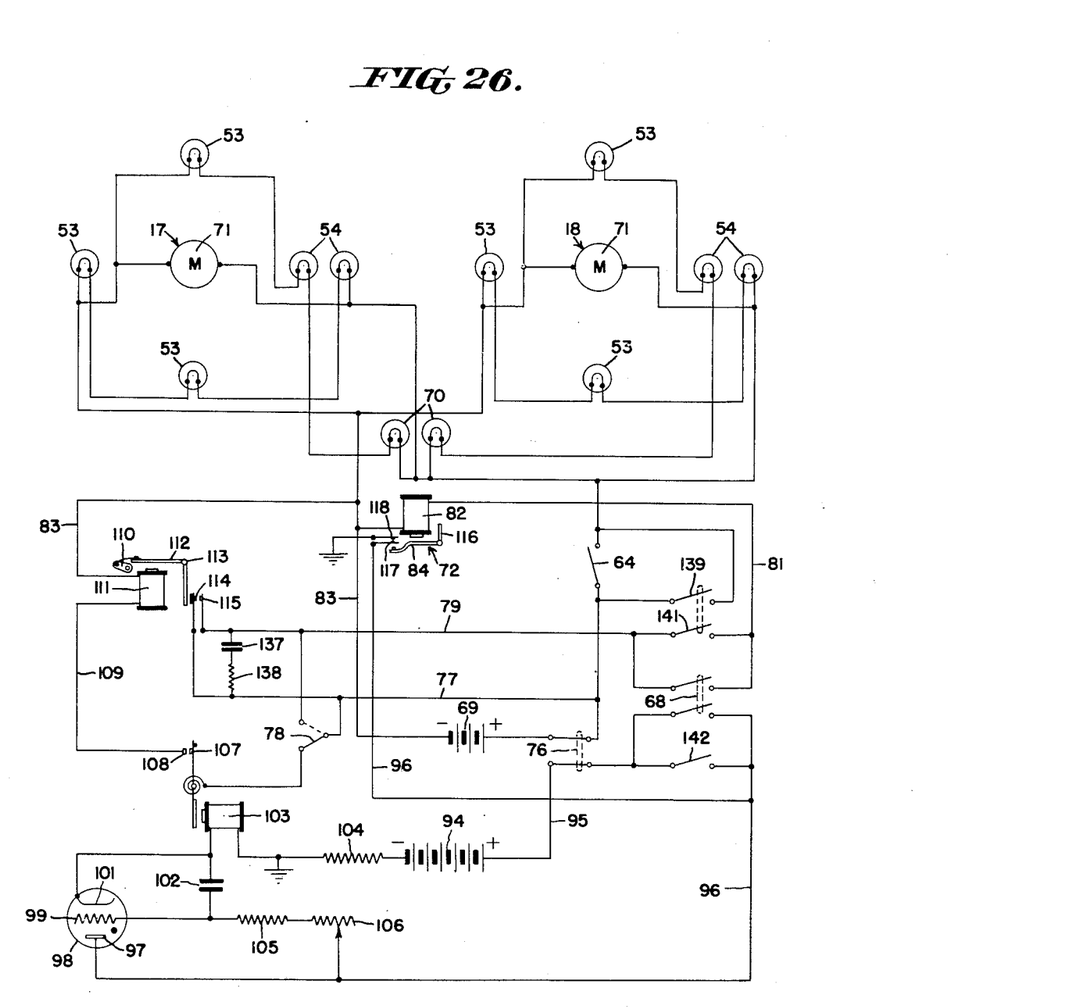
Fig. 26 illustrates in a diagrammatic form a complete electrical system suitable for use with the recorder of the present invention.

Referring to Fig. 26, it will be seen that as switch 64 closes a circuit is closed from a battery 69 to the gyro motors 71 and lamps 53, 54 and 70 thereby lighting the lamps and setting the motors in operation before the torpedo is fired.

Figure 20:
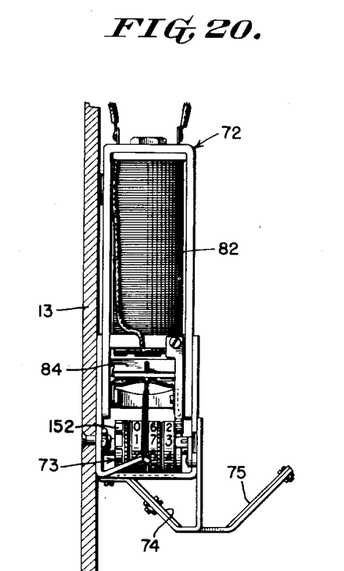
Fig. 20 is a view in elevation of one side of the counter relay employed herein.
Figure 21:
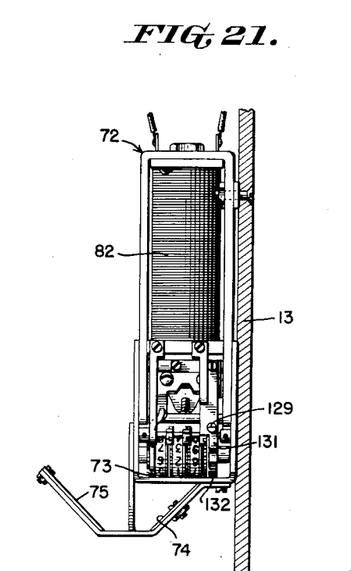
Fig. 21 is a view in elevation of the opposite side of the counter relay.
Figure 22:
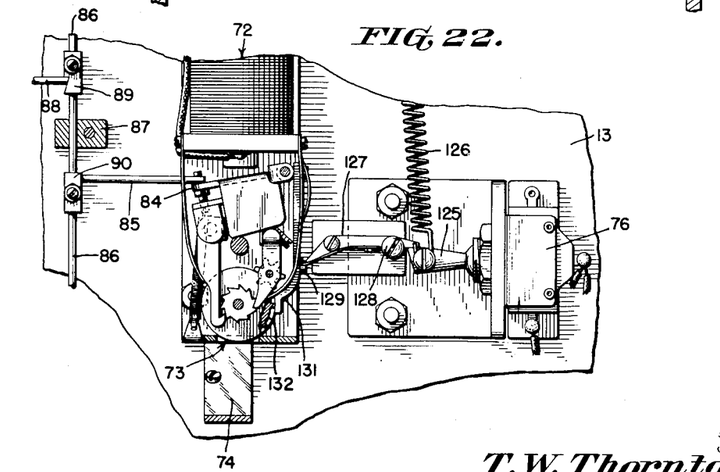
Fig. 22 is a view, partly in section and partly in elevation, showing the manner in which the operation of the cut-off switch is controlled by the counter relay.

A conventional counter type relay 72, Figs. 20 to 22, secured to the mounting plate 13 in any suitable manner, is employed for the purpose of renumbering each picture frame, Fig. 24, taken by camera 56, in order that the sequence of frames may be positively identified. The numerals are arranged on a counter mechanism 73 on the relay and two mirrors 74 and 75 are associated with the relay in such a manner as to cause the numerals to be reflected to mirror 55, Fig. 23, and thence to the camera lens, a pair of electric lights 70, Fig. 3, being provided to illuminate the numerals on mechanism 73. As the inertia switch 68, Fig. 26, is closed upon firing of the torpedo, a circuit is closed from the positive terminal of battery 69, through a normally closed cut-off switch 76, over conductor 77, through a lock-off switch 78 in its dashed line position, over conductor 79, closed inertia switch 68, conductor 81, coil 82 of relay 72, and conductor 83 from whence the circuit is completed to the negative terminal of battery 69, thereby energizing relay 72 and causing armature 84 thereof to move into engagement with the coil of the relay, Fig. 22.

As the armature 84 of relay 72, Fig. 22, is caused to move, a rod 85 secured thereto is caused to move therewith. Rod 85, Fig. 22, is also affixed to another rod 86 by a block 90 to cause rod 86 to move. When in its initial unoperated position, rod 86 is adapted to maintain lever 38, Figs. 3 and 6, associated with gyro 17 in the initial position thereof against the force of the spring 42, Fig. 3, thereby to lock the motor housing 29 of gyro 17. As rod 86 is moved, lever 38 is released and caused to rotate about point 39 by spring 42, thereby to disengage pin 36 from hole 37 and release the motor housing 29. It will be noted that the rod 86 is maintained in position by means of a plurality of bearing blocks 87 through which the rod is adapted slideably to pass.

An additional rod 88 is provided and is adapted normally to maintain lever 38 associated with gyro 18 in the initial unoperated position thereof to lock the motor housing of gyro 18, rod 88 being slideably arranged on the mounting plate 13 by additional bearing blocks 87. The opposite end of rod 88 engages a cam locking block 89 secured to rod 86 and movable therewith such that movement of rod 86 releases rod 88 for movement under power of a coil spring 91. One end of spring 91 is secured to mounting plate 13 and the other end thereof is secured to a movable arm 92 of the lock-off switch 78. Arm 92 is arranged in such a manner as to engage a locking block 93 affixed to rod 88 and movable therewith whereby the force of spring 91 is transmitted to rod 88 to cause movement thereof when rod 86 has moved sufficiently to disengage cam locking block 89 and rod 88. When this occurs, the motor housing of gyro 18 is released and the lock-off switch 78 is moved from the position shown in dotted lines in Fig. 26 to the position shown in solid outline.

Referring again to Fig. 26, closure of inertia switch 68 further completes a circuit to a relaxation type oscillator as follows: positive terminal of a battery 94, conductor 95, cut-off switch 76, inertia switch 68, conductor 96 and thence to the plate 97 of a gaseous electron discharge device 98, thereby to supply suitable operating plate potential to tube 98. Tube 98 further comprises a control grid 99 and a cathode 101 with a condenser 102 being connected therebetween, the cathode being tied to the negative terminal of battery 94 through a relay 103 and resistor 104. As the inertia switch closes, condenser 102 becomes charged at a rate controlled by the value of resistance present in the charging circuit thereof, such resistance being provided by a resistor 105 and a variable resistor 106.

When condenser 102 becomes charged to a predetermined value, the potential appearing at the control grid 99 of tube 98 is sufficient to cause the tube to break down and conduct current. When this occurs, relay 103 becomes energized and the spring biased armature 107 associated therewith is caused to move into engagement with stationary contact 108. As armature 107 moves into engagement with contact 108, a circuit is closed from the positive terminal of battery 69, through the cut-off switch 76, conductor 77, lock-off switch 78 which now is in the full line position thereof, having been moved into this position in a manner hereinafter to be described, armature 107 and contact 108 of relay 103, conductor 109, through a relay 111, and conductor 83 from whence the circuit is completed to the negative terminal of battery 69, thereby energizing relay 111.

As relay 111 becomes energized, its associated armature 112 is caused to pivot about point 113 thereby operating a shutter mechanism 110 of the camera 56, such operation of the shutter mechanism being described in more detail hereinafter. Rotation of armature 112 further closes contacts 114 and 115 of relay 111 thereby completing a circuit from battery 69 to counter relay 82 over the following path: positive terminal of battery 69, cut-off switch 76, conductor 77, contacts 114 and 115 of relay 111, conductor 79, inertia switch 68, conductor 81, coil 82 of relay 72, conductor 83 from whence the circuit is completed to the negative terminal of battery 69. Upon energization of coil 82 of relay 72, its associated armature 116 is caused to close contacts 117 and 118 of relay 72. When this occurs, a circuit is closed from the positive terminal of battery 94, through conductor 95, cut-off switch 76, inertia switch 68, conductor 96, contacts 117 and 118 of relay 72 and thence to ground and from ground through resistor 104 to the negative terminal of battery 94, whereby battery 94 effectively is short-circuited and the plate potential of tube 98 is removed therefrom.

Removal of the plate potential, of course, extinguishes tube 98 and current no longer flows through relay 103 thus opening contacts 107 and 108 thereof and interrupting the circuit to relay 111. Deenergization of relay 111 disengages contacts 114 and 115 thereof thus interrupting the circuit to the counter relay 72. In order to prevent contacts 114 and 115 of relay 111 from sparking, condenser 137 and resistor 138 are shunted across the contacts.

Deenergization of the counter relay disengages contacts 117 and 118 thereof thereby removing the short-circuit from battery 94 whereupon operating potential is again applied to the plate of tube 98. It will be understood, however, that during the time tube 98 is conducting current, condenser 102 discharges through the tube such that the tube is not immediately rendered conductive upon the reapplication of plate potential thereto by reason of the grid potential being lower than that required for the tube to break down. When the condenser has recharged, however, to a predetermined value, the tube will be rendered conductive and the foregoing cycle of operations is repeated.

Upon closure of inertia switch 68, the counter relay 72 is energized, as heretofore described, and is caused to set up the numeral one which is reflected by the mirror system to the camera lens. Shortly thereafter, the lock-off switch is moved to the position shown in solid outline in Fig. 26 whereby the circuit to the counter relay is interrupted and the relay is deenergized leaving the numeral one set up thereon. Positioning of the lock-off switch as shown in solid outline necessitates the closure of contacts 114 and 115 of the shutter relay 111 in order to reclose the counter relay circuit. In accordance with this arrangement, the subsequent operation of the oscillator circuit causes a picture to be taken by the camera followed by the energization of the counter relay and the setting up thereby of numeral two whereby the next succeeding picture taken by the camera will be correctly marked with the numeral two.

Figure 17:
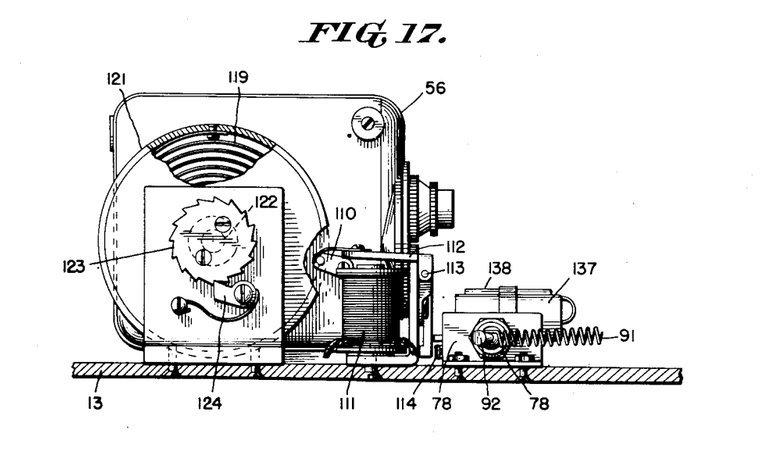
Fig. 17 is a view in elevation of the camera employed herein as viewed from the winding side thereof and showing several of the elements associated therewith.
Figure 18:
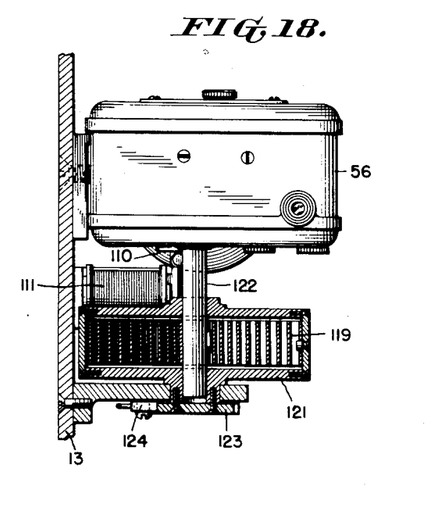
Fig. 18 is a sectional view taken substantially along the line 18—18 of Fig. 3 and showing the auxiliary driving spring of the camera.
Figure 19:
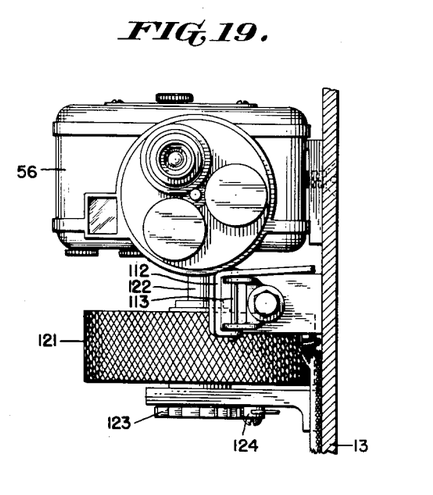
Fig. 19 is a front elevation of the camera.

As heretofore described, camera 56 is a conventional movie camera. The driving spring of the camera, however, is inadequate for present purposes and for this reason an additional spring 119, Figs. 17 and 18, is provided. Spring 119 is disposed exteriorly of the camera and within a rotatably mounted knurled spring housing 121, Figs. 17 to 19, one end of the spring being secured to the housing and the opposite end thereof being secured to a shaft 122 which replaces the usual camera winding mechanism. Rotation of the housing 121 in a clockwise direction winds both the driving spring within the camera and the added spring 119, rotation of the housing in a counterclockwise direction being prevented by the provision of a ratchet wheel 123 affixed to the housing and a cooperating pawl 124. It will be understood of course, that the tripping of shutter mechanism 110 causes the driving mechanism of the camera to move the film ahead one frame at a time at a time when the shutter is closed, the film being moved ahead under power of the conventional driving spring and the added driving spring 119.

The cut-off switch 76, Fig. 22, is a normally closed switch which when operated is adapted to cut off the power in all of the circuits in the system shown in Fig. 26. Switch 76 is preferably of the toggle type and comprises an arm 125 to which one end of a coil spring 126 is secured. The other end of spring 126 is secured to the mounting plate 13 in such a manner as to exert a continuous force on the arm 125. Switch 76 is maintained in the closed position against the force of spring 126 by a lever 127 which is pivotally mounted about a screw 128, one end of the lever being adapted to engage arm 125. The other end of lever 127 abuts against a stop 129 on a follower 131 associated with the counter relay. With the addition of the camera driving spring 119, the camera is adapted to take at least a thousand frames and after the 999th frame, the spring loaded follower 131 falls into a notch (not shown) provided in the wheel 132 which makes one revolution after the counter relay 72 has operated 999 times, thereby releasing lever 127 from stop 129 and disengaging the lever 127 and arm 125. When this occurs, the arm 125 is free to move under power of spring 126 and the cut-off switch, Figs. 22 and 26, is opened and no further cycles of operation are performed by the electrical system.

It will be noted from Fig. 26 that a plurality of test switches 139 and 141 and 142 are provided in the electrical system for the purpose of testing the circuits from battery 69 to the gyro motors 71 and to the counter relay 72 and from battery 94 to the relaxation oscillator including cold cathode tube 98, respectively.

As heretofore described, gyros 17 and 18 are each mounted pendulously whereby the necessity of finely balancing the gyros is substantially overcome. Pendulous mounting of gyro 17 is accomplished by securing to the bottom thereof an additional weight 133, Figs. 3 and 5, and mounting the gyro in the gimbals 19 and 21. Gyro 17 is adapted to respond to pitch of the torpedo or the angular motion thereof about a horizontal axis athwartship and to respond to roll of the torpedo or the angular motion about the longitudinal axis of the torpedo. As the torpedo rolls, such roll being of short period, the grid plate 43 associated therewith moves with respect to the member 32 and the outer gimbal 19 moves with respect to the gyro motor housing 29. It will be noted that the roll of a torpedo during a test run thereof usually exceeds 15 degrees such that a number of balls are provided and are spaced at 15 degree intervals. Therefore, if the roll exceeds 7.5 degrees, a new ball approaches nearer to the center of opening 44 and the displacement from its initial position of the ball nearest the center of the opening is taken as a direct indication of the angular displacement of the torpedo from its immediately preceding position.

As the torpedo pitches, such pitch being of short period, gimbals 19 and 21 of gyro 17 move with respect to the motor housing thereof and the grid plate associated therewith also moves with respect to the indicating member and balls affixed thereon such that the displacement of any one of the balls from a line through the center of the opening in the grid plate and parallel to the balls provides a direct indication of the angular motion of the torpedo about a horizontal axis athwartship. In the event that the torpedo sustains a pitch of long period and thereafter levels off, the inertia element and motor housing of gyro 17 may become jammed against gimbal 19 during the pitch of the torpedo and as the torpedo levels off, the inertia element and motor housing tend to remain in engagement with gimbal 19. However, the force of gravity acting upon weight 133 provides a torque adapted gradually to restore the housing and inertia element to its initial position with respect to gimbal 19.

Figure 8:
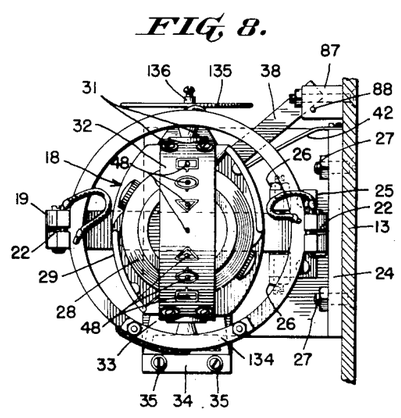
Fig. 8 is a detail view showing one of the gyros included in the recorder in the locked position thereof.
Figure 10:
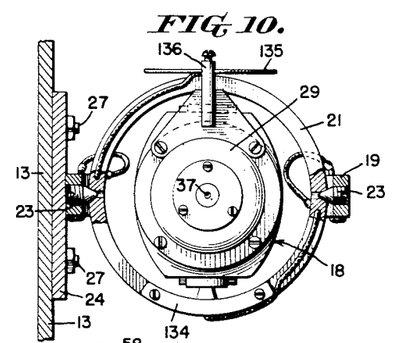
Fig. 10 is a view similar to that of Fig. 8 but viewed from the opposite end thereof to show the manner in which the gyro is mounted.
Figure 11:
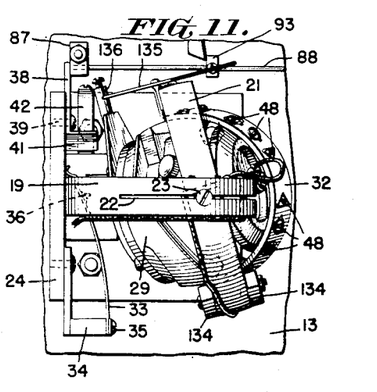
Fig. 11 is a detail view showing the gyro of Fig. 8 in an operating position.
Figure 12:
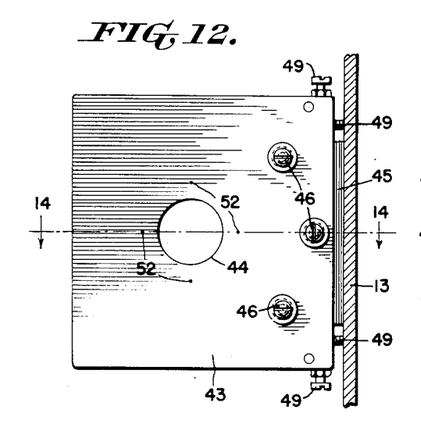
Fig. 12 is a front elevation of a grid plate associated with one of the gyros.
Figure 13:
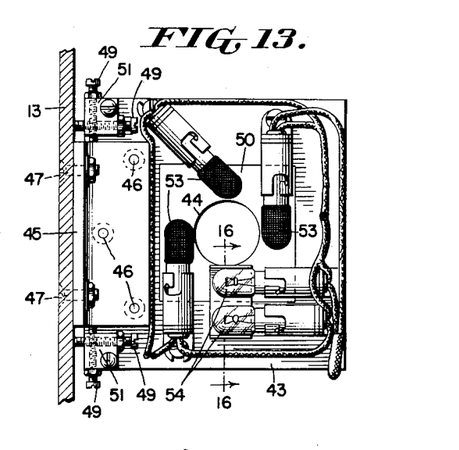
Fig. 13 is a rear elevation of the grid plate shown in Fig. 12.
Figure 14:
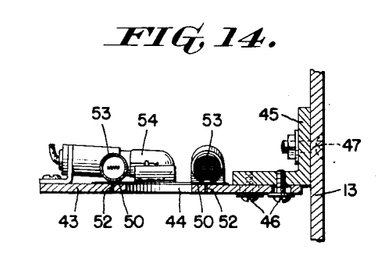
Fig. 14 is a view in section taken along the line 14—14 of Fig. 12.

Gyro 18 is also provided with an additional weight 134, Figs. 8, 10, and 11, secured to the inner gimbal 21 thereof and further is provided with a restoring spring 135, one end of which is secured to the inner gimbal and the other end thereof is secured to a rod 136 which in turn is affixed to its gyro motor housing. If the torpedo sustains a change in heading of long period and then runs straight, the motor housing and inertia element of gyro 18 gradually will be restored by spring 135 to the initial position with respect to gimbal 19. The indication of roll and yaw of the torpedo which is provided by gyro 18 is obtained in a manner similar to the indications obtained from gyro 17. The displacement of the balls arranged on the indicating member associated with gyro 18 provides a measure of the roll of the torpedo and the displacement of any one of the balls from a line through the center of the opening 44 in the associated grid plate and parallel to the balls provides a measure of the yaw of the torpedo. Since each gyro is responsive to roll, the photographs, Fig. 24, taken by the camera of the magnitude of torpedo roll indicated by each of the gyros may be compared to check the accuracy and balancing of the gyros.

Figure 25:
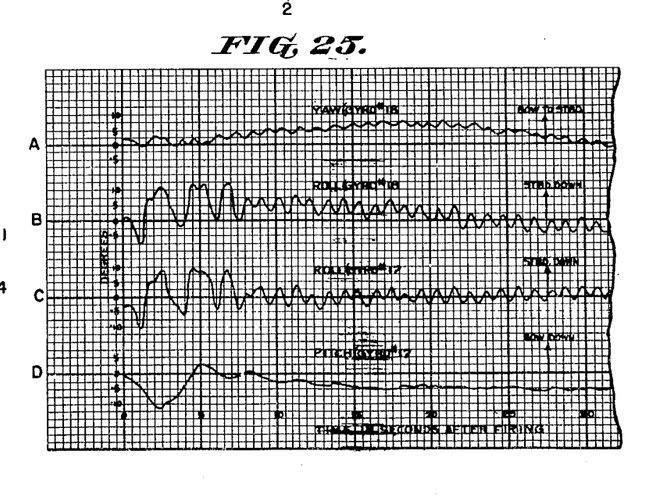
Fig. 25 illustrates graphically the data transcribed from the exposed film.

Fig. 24 illustrates a typical exposed film showing the position of the balls 48 on the indicating members with respect to the center of the opening 44 in the grid plate and also showing the manner in which each frame is numbered. The top opening 44 is a photograph of the opening in the grid plate associated with gyroscope 18 and the bottom opening is a photograph of the opening in the grid plate associated with gyroscope 17. Fig. 25 illustrates in graphic form the data obtained by the recorder and transcribed from the film, Fig. 24, the displacement of the balls being plotted in degrees against a time axis, the time intervals of which are provided by the relaxation oscillator.

The data obtained from the film of Fig. 24 can be transcribed to form a graph shown in Fig. 25 which is indicative of the deviations of the torpedo from a true course.

Referring now more particularly to Fig. 25, it will be noted that four lines A to D are ruled horizontally on coordinate paper, line A being the zero line for the yaw as recorded by gyroscope 18, line B being the zero line for roll as recorded from gyroscope 18, line C being the zero line for roll as recorded from gyroscope 17 and line D being the zero line for pitch as recorded from gyroscope 17.

The pictures, Fig. 24, are projected frame by frame on a ground glass screen (not shown) and the graph paper is placed on the screen so the ruled lines A to D represent one diagonal of a square; for example, the paper may be lined up with the zero line B in registry with the horizontally disposed points 52 of the top picture and with the seconds measured from zero on the time axis aligned with vertical reference points 52 and corresponding to the number appearing at the center of the frame.

The deflections of the steel ball 48 appearing above or below the ruled line B, as the case may be, represent the angle of roll and can be plotted directly on the coordinate paper in terms of angles of roll. In the case of roll, the symbol enclosing balls 48 must be checked, because a ball with a different symbol appearing about the ball will appear for each 15° of roll of the torpedo.

The yaw and pitch may be plotted as coordinates by placing the paper with zero lines A and D respectively on vertically aligned reference points 52 and the deviation of balls 48 can be plotted directly on the paper in terms of angles of yaw and pitch respectively, when the time in seconds as measured along the abscissa corresponds to the number indicated at the center of the frame. Through an observation of the general shape of the curves of Fig. 25, a general indication of the time lag in the torpedo control system may be had whereby suitable adjustment therein may be made.

From the foregoing it will be apparent that a motion recorder has been provided which is well adapted to fulfill the aforesaid objects of the invention. While the invention has been disclosed in particularity with reference to an example thereof which gives satisfactory results, it readily will be apparent to those skilled in the art to which the invention appertains, after understanding the invention, that further modifications and embodiments may be made without departing from the spirit and scope of the invention as defined by the claims appended hereto.

The present invention may be manufactured and used by or for the Government of the United States of America for governmental purposes without payment of any royalties thereon or therefor.

What is claimed as new and desired to be secured by Letters Patent of the United States is:

1. Apparatus for recording the angular yaw, pitch and roll motion of a moving body comprising, in combination, a reference system arranged within the body and adapted to resist individually the yaw, pitch and roll of the body, a system arranged within said body and adapted to follow the angular motion thereof, and means for periodically photographing the instantaneous yaw, pitch and roll displacement between said systems in the form of a composite photographic record.

2. Apparatus for recording the angular yaw, pitch and roll motion of a moving body comprising, in combination, a reference system arranged within the body and adapted to resist individually the yaw, pitch and roll of the body, a system arranged within said body and adapted to follow the angular motion of the body, means for cyclically photographing the instantaneous yaw, pitch and roll displacement between said systems, and control means including an oscillator operatively connected to said photographing means adapted to cause said cyclic operation of said photographing means.

3. Apparatus for recording the angular yaw, pitch and roll motion of an initially projected moving body comprising, in combination, a reference system arranged within said body and adapted to resist individually the yaw, pitch and roll of the body, a system arranged within said body and adapted to follow the angular yaw, pitch and roll motion of the body, means for cyclically photographing the relative movement between said systems, control means including an oscillator operatively connected to said photographic means and adapted to cause said cyclic operation of said photographing means, and means responsive to the projected movement of said body and adapted to render said control means effective as said body is projected.

4. Apparatus for recording the angular yaw, pitch and roll motion of an initially projected moving body comprising, in combination, a reference system including a plurality of gyroscopes having mutually perpendicular spinning axes arranged within said body and adapted to resist the yaw, pitch and roll of the body, a system arranged within said body and adapted to follow the angular motion thereof, means for photographing cyclically the relative movement between said systems, control means including a pulsating circuit operatively connected to said photographic means and adapted to cause said cyclic operation of said photographing means, and means responsive to the projected movement of the body for rendering said control means effective for a predetermined interval after said body has been projected.

5. Apparatus for recording the angular yaw, pitch and roll motion of an initially projected moving body comprising, in combination, a reference system arranged within said body including a pair of gyroscopes having mutually perpendicular spinning axes and adapted to resist the yaw, pitch and roll of the body, a system arranged within said body and adapted to follow the angular motion of the body, means for cyclically photographing the instantaneous yaw, pitch and roll displacement of said movable system with respect to said reference system, control means including an oscillator circuit operatively connected to said photographing means and adapted to cause said cyclic operation of said photographing means as said body moves, means responsive to the initial projected movement of said body and adapted to render effective said control means as said body is projected, and means for rendering ineffective said control means a predetermined interval after said body has been projected.

6. A device adapted to record the angular yaw, pitch and roll motion of a moving body comprising, in combination, a fixed system disposed within said body and adapted to follow the angular motion thereof, means adapted to establish within said body a reference system against which individual measurement of the yaw, pitch and roll displacement of said fixed system is taken, photographing means, and an optical system associated with said movable and said reference systems in such a manner as to reflect to said photographing means images representing the relative yaw, pitch and roll displacement therebetween.

7. A device adapted to record the angular yaw, pitch and roll motion of a moving body comprising, in combination, a fixed system disposed within said body and adapted to follow the angular motion thereof, means including a pair of gyroscopes having mutually perpendicular spinning axes adapted to establish within said body a reference system against which individual measurement of the yaw, pitch and roll displacement of said fixed system is taken, photographing means, an optical system associated with said fixed and said reference systems in such a manner as to reflect to said photographing means images representing the relative displacement therebetween, and pulsating circuit control means operatively connected to said photographing means and adapted to cause cyclic operation of said photographing means.

8. A device adapted to record the angular yaw, pitch and roll motion of a tube launched torpedo comprising, in combination, a fixed system disposed within said torpedo and adapted to follow the angular motion thereof, means including a pair of gyroscopes having mutually perpendicular spinning axes adapted to establish within said torpedo a reference system against which individual measurement of the yaw, pitch and roll displacement of said fixed system is taken, photographing means, an optical system associated with said movable and said reference systems in such a manner as to reflect to said photographing means images representing the relative displacement therebetween, pulsating circuit control means operatively connected to said photographing means and adapted to cause cyclic operation of said photographing means in succession at predetermined intervals, and means responsive to launching of said torpedo for rendering said control means effective when said torpedo is projected from the torpedo tube.

9. A device adapted to record the angular yaw, pitch and roll motion of a tube launched torpedo comprising, in combination, a fixed system disposed within said torpedo and adapted to follow the angular motion thereof, means including a pair of gyroscopes having mutually perpendicular spinning axes adapted to establish within said body a reference system against which individual measurement of the yaw, pitch and roll displacement of said fixed system is taken, photographing means, an optical system associated with said fixed and said reference systems in such a manner as to reflect to said photographing means images representing the relative displacement therebetween, electronic pulsating circuit control means operatively connected to said photographing means and adapted to cause cyclic operation of said photographing means in succession at predetermined spaced intervals, and means for rendering said control means effective for a predetermined interval after said torpedo has been projected from a torpedo tube.

10. A device adapted to record the angular yaw, pitch and roll motion of a tube launched torpedo comprising, in combination, a fixed system disposed within said torpedo and adapted to follow the angular motion thereof, means including a pair of gyroscopes having mutually perpendicular spinning axes adapted to establish within said torpedo a reference system against which individual measurement of the displacement of said fixed system in the yaw, pitch and roll direction is taken, photographing means, an optical system associated with said fixed and said reference systems in such a manner as to reflect to said photographing means images representing the relative displacement therebetween, electronic intermittently operable control means operatively connected to said photographic means and adapted to cause cyclic operation of said photographing means in succession at predetermined spaced intervals of time, means responsive to launching of said torpedo and adapted to render effective said control means as said torpedo is projected from a torpedo tube, and means for rendering ineffective said control means a predetermined interval after said torpedo has been projected.

11. A device adapted to measure and record the angular motion about three mutually perpendicular axes of a moving torpedo and comprising, in combination, a plurality of gyroscopes having their axes of rotation disposed mutually perpendicular, a plurality of grid plates respectively associated with said plurality of gyroscopes and adapted to follow the angular motion of said torpedo, photographing means including an electro-responsive shutter for causing operation thereof as the shutter operates, an optical system arranged in such a manner as to reflect to said photographing means images representing the displacement of each one of said plurality of grid plates with respect to the gyroscope associated therewith, means including a pulsing oscillator electrically connected to said shutter for causing intermittent operation of said shutter and photographing means, and means responsive to launching of said torpedo for initiating the operation of said oscillator.

12. A device adapted to measure and record the angular motion about three mutually perpendicular axes of a moving body and comprising, in combination, a plurality of gyroscopes having their axes of rotation disposed mutually perpendicular, a plurality of grid plates respectively associated with said plurality of gyroscopes and adapted to follow the angular motion of said body, means for taking consecutively numbered photographs in succession at predetermined uniform intervals of the displacement of each one of said plurality of grid plates with respect to the gyroscope associated therewith simultaneously, and control means operatively connected to said photographic means for causing cyclic operation of said photographing means.

13. A device adapted to measure and record the angular motion about three mutually perpendicular axes of a moving body and comprising, in combination, a plurality of gyroscopes having their axes of rotation disposed mutually perpendicular, a plurality of grid plates individual to said plurality of gyroscopes and adapted to move with respect to their associated gyroscopes in accordance with the angular motion of said body, photographing means including an electro-responsive shutter for causing operation of the photographing means as the shutter operates, an optical system arranged in such a manner as to reflect to said photographing means images representing the displacement of each one of said plurality of grid plates with respect to the gyroscope associated therewith, means including a pulsing oscillator operatively connected electrically to said shutter for causing intermittent operation of said photographing means and shutter at predetermined spaced intervals, and means responsive to the initial movement of the body for rendering said oscillator effective for a predetermined interval during motion of the body.

14. A device adapted to measure and record the pitch, roll and yaw of a pressure launched torpedo during a test run thereof and comprising, in combination, a plurality of grid plates disposed within said torpedo and adapted to follow the angular motion thereof, a plurality of electrically driven gyroscopes respectively associated with said plurality of grid plates and arranged within said torpedo with the axes of rotation thereof mutually perpendicular, said plurality of gyroscopes being adapted to provide reference points against which measurements of the displacement of the grid plates are taken, photographing means including an electro-responsive shutter for causing operation thereof as the shutter operates, an optical system arranged in such a manner as to reflect to said photographing means the position of each one of said plurality of grid plates with respect to the gyroscope associated therewith, means including an oscillator operatively electrically connected to said shutter and adapted to cause cyclic operation of said shutter and photographing means in succession at predetermined intervals, means responsive to said launching pressure and adapted to set in operation said plurality of gyroscopes prior to the launching of said torpedo, and inertia responsive means for rendering said oscillator effective as said torpedo is launched.

15. A device adapted to measure and record the angular motion about three mutually perpendicular axes of a moving body and comprising, in combination, a plurality of grid plates disposed within said body and adapted to follow the angular motion thereof, a plurality of electrically driven gyroscopes respectively associated with said plurality of grid plates and arranged within said body with the axes of rotation thereof mutually perpendicular, said plurality of gyroscopes being adapted to provide reference points against which measurements of the displacement of the grid plates are taken, means for releasably locking said plurality of gyroscopes in an initial position, means adapted to be operated prior to the launching of said body for setting in operation said plurality of gyroscopes as said body is launched, and means for photographing the displacement of each one of said plurality of grid plates with respect to its associated reference point.

16. Apparatus for recording the roll and pitch of a motor driven body comprising a gyroscope including an outer gimbal ring fixedly mounted on said body for oscillation therewith, an inner gimbal ring mounted for oscillation about a horizontal axis arranged 90 degrees with respect to the direction of motion of said body and a rotor mounted for spinning motion about an axis perpendicular to the axes of oscillation of said outer and inner gimbal rings, a segmentally marked loop secured to said inner ring for oscillation therewith about the axis thereof and also about the axis of said outer ring, a reference system secured to said body for following the angular motion thereof and arranged to display the relative displacement between said loop and said reference system, and means for photographing relative displacement between said loop and said reference system at predetermined spaced intervals of time whereby the roll and pitch of the body is recorded on said photographing means.

17. Apparatus for recording the roll and yaw of an automotive body comprising a gyroscope including an outer gimbal ring fixedly mounted on said body for oscillation therewith, an inner gimbal ring mounted for oscillation about a vertical axis arranged 90° with respect to the direction of motion of said body and a rotor mounted for spinning motion about an axis perpendicular to the axes of oscillation of said outer and inner gimbal rings, a segmentally marked loop secured to said inner ring for oscillation therewith about the axis thereof and also about the axis of said outer ring, a reference system secured to said body for following the angular motion thereof and arranged to display the relative movement between said loop and said reference system, and means for photographing relative movement between said loop and said reference system at predetermined spaced intervals of time whereby the roll and yaw of the body is recorded on said photographing means.

18. A recording instrument as claimed in claim 17 having a counting mechanism arranged to be photographed by said photographing means, and an electronic circuit adapted to be periodically energized and deenergized for operating said photographing means at predetermined spaced intervals of time and moving said counting mechanism consecutively one step at a time during successive intervals respectively when the photographing means is inoperative.

19. Apparatus for recording the roll, pitch and yaw of an automotive liquid-borne body comprising a first gyroscope including a first outer gimbal ring fixedly mounted on said body for oscillation therewith, a first inner gimbal ring mounted for oscillation about a horizontal axis arranged at right angles to the direction of motion of said body and a first rotor mounted for spinning motion about an axis perpendicular to the axes of oscillation of said outer and inner gimbal rings, a first hoop secured to said first inner gimbal ring for oscillation therewith about the axis thereof and about the axis of said first outer gimbal ring and having reference characters thereon about the periphery thereof at predetermined spaced intervals, a first reference system secured to said body and constructed and arranged adjacent said hoop to display relative displacement between said first hoop and said first reference system, a second gyroscope including an outer gimbal ring mounted for oscillation about a horizontal axis in alignment with the direction of motion of said body, an inner gimbal ring mounted for oscillation about a vertical axis arranged at right angles to the direction of motion of said body, and a rotor mounted for spinning motion about an axis perpendicular to the axes of oscillation of said last named outer and inner gimbal rings, a second hoop secured to the inner gimbal ring of the second gyro for oscillation therewith about the axis thereof and about the axis of the outer gimbal ring of the second gyro and having reference characters thereon about the periphery thereof at predetermined spaced intervals, a second reference system secured to said body and constructed and arranged adjacent said second hoop to display the relative displacement between said second loop and said second reference system, and means for simultaneously photographing the relative displacement between said first hoop and the first reference system and said second hoop and the second reference system simultaneously in succession at predetermined uniform spaced intervals of time during the movement of the body whereby the roll, pitch and yaw is recorded on said photographing means at said intervals.

20. A device for recording the roll, pitch and yaw of a running torpedo comprising, in combination, a plurality of gyroscopes having the spinning axes thereof mutually perpendicular, a grid plate associated with each of said gyroscopes respectively for following the angular motions of said torpedo, means including an electro-responsive shutter for photographing in succession as the shutter operates the relative displacement of each of said grid plates with respect to the gyroscope associated therewith, and means including an oscillating circuit electrically connected to said shutter for causing intermittent operation of said photographing means at uniform predetermined spaced intervals.

THEODORE W. THORNTON.

REFERENCES CITED

The following references are of record in the file of this patent:

UNITED STATES PATENTS

| Number | Name | Date |
|---|---|---|
| 683,703 | Nindemann | Oct. 1, 1901 |
| 689,650 | Moriarty | Dec. 24, 1901 |
| 729,491 | Dick | May 26, 1903 |
| 1,073,832 | Wlodzimirski | Sept. 23, 1913 |
| 1,399,032 | Sperry | Dec. 6, 1921 |
| 1,404,422 | Barr et al. | Jan. 24, 1922 |
| 1,436,237 | Conzi | Nov. 21, 1922 |